United States Patent
Barbu et al.

(10) Patent No.: US 12,140,688 B2
(45) Date of Patent: Nov. 12, 2024

(54) METHOD AND AN APPARATUS FOR EFFICIENT POSITIONING

(71) Applicant: Nokia Technologies Oy, Espoo (FI)

(72) Inventors: Oana-Elena Barbu, Aalborg (DK); Johannes Harrebek, Aalborg (DK); Benny Vejlgaard, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 348 days.

(21) Appl. No.: 17/651,252

(22) Filed: Feb. 16, 2022

(65) Prior Publication Data

US 2022/0268872 A1 Aug. 25, 2022

(30) Foreign Application Priority Data

Feb. 16, 2021 (FI) .................................. 20215156

(51) Int. Cl.
*H04W 4/029* (2018.01)
*G01S 5/00* (2006.01)
*G01S 11/06* (2006.01)

(52) U.S. Cl.
CPC .............. *G01S 5/0036* (2013.01); *G01S 11/06* (2013.01); *H04W 4/029* (2018.02); *G01S 2205/008* (2013.01)

(58) Field of Classification Search
CPC ............................ H04W 64/00; H04W 64/003
See application file for complete search history.

(56) References Cited

U.S. PATENT DOCUMENTS

| | | |
|---|---|---|
| 2011/0275385 A1 | 11/2011 | Escolar-Piedras et al. ................. 455/456.1 |
| 2013/0337845 A1 | 12/2013 | Chen et al. ................ 455/456.5 |
| 2014/0064126 A1 | 3/2014 | Lim et al. ...................... 370/252 |
| 2016/0029224 A1 | 1/2016 | Edge .................................. 5/252 |
| 2017/0289952 A1* | 10/2017 | Muquet ................. G01S 5/0236 |
| 2018/0110026 A1 | 4/2018 | Kadelka ............................. 64/3 |

(Continued)

FOREIGN PATENT DOCUMENTS

| | | | | |
|---|---|---|---|---|
| JP | 4709886 B2 | * | 6/2011 | ............. G01S 19/14 |
| WO | WO 2020/223908 A1 | | 11/2020 | |

OTHER PUBLICATIONS

3GPP TSG RAN WG1 #103-e, 3-Meeting, Oct. 26-Nov. 13, 2020, R1-2007666, "Discussion on potential enhancements", vivo, 49 pgs.

*Primary Examiner* — Kevin Kim
(74) *Attorney, Agent, or Firm* — Harrington & Smith

(57) ABSTRACT

The embodiments relate to an apparatus and a method, where the apparatus includes circuitry configured for listening and receiving a positioning measurement request from a location server at a first point of time; circuitry configured for determining whether a set of positioning metrics need to be measured, wherein the determining is based on an output from a machine learning classifier to which channel metrics between two points of time is given as input; whether the output indicates a new measurement, circuitry configured for performing the measurement of positioning metrics from all transmission points; or if not, circuitry configured for determining which subset of transmission points needs to be measured and circuitry configured for performing the measurement of such subset of transmission points; and circuitry configured for reporting the measured positioning metrics to the location server.

20 Claims, 7 Drawing Sheets

(56) References Cited

U.S. PATENT DOCUMENTS

2019/0319868 A1 10/2019 Svennebring et al. ............. 24/8
2019/0362237 A1 11/2019 Choi et al.

* cited by examiner

METHOD AND AN APPARATUS FOR EFFICIENT POSITIONING

TECHNICAL FIELD

The present solution generally relates to a solution for determining a position of a user equipment.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

5G stands for the fifth-generation mobile network, which enables connection between machines, objects and devices. One of the categories introduced in 5G NR (Fifth Generation New Radio) networks is NR Positioning. The two latest versions of the 5G standard are 3GPP Release 16 and 17.

3GPP Release 16 introduced various location technologies to support regulatory and commercial use case. The horizontal positioning requirements for indoor scenarios and outdoor scenarios were specified.

3GPP Release 17 is targeted for a higher accuracy location requirements to meet performance targets having sub-meter level positioning accuracy <1 m for general commercial use cases, and <0.2 m position accuracy for IIoT (Industrial Internet of Things) use cases.

The positioning protocol according to the standard mandates the UE to report back timing and/or angular measurements for all detectable beams of all detectable transmit receive points (TRP) upon request from a network entity, e.g. from a location management function (LMF). The UE treats each positioning request identically, i.e. by listening for, and measuring beamed downlink positioning reference signals (PRS) during a certain time window.

In a beamed transmission-reception scenario, the UE needs to measure hundreds of beams for each request. It becomes therefore impractical for the LMF to ask for the measurements at each request, without prior evaluation of whether the measurement is useful. Thus, there is a need for an improved device-efficient solution which can accommodate a reduced positioning session.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the example embodiments are disclosed in the dependent claims and in the corresponding images and description.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect, there is provided an apparatus comprising means for listening and receiving a positioning measurement request from a location server at a first point of time; means for determining whether a set of positioning metrics need to be measured, wherein the determining is based on an output from a machine learning classifier to which channel metrics between two points of time is given as input; whether the output indicates a new measurement, means for performing the measurement of positioning metrics from all transmission points; or if not, means for determining which subset of transmission points needs to be measured and means for performing the measurement of such subset of transmission points; and means for reporting the measured positioning metrics to the location server.

According to a second aspect, there is provided an apparatus comprising at least one processor and at least one memory, said at least one memory stored with computer program code thereon, the at least one memory and the computer program code configured to, with the at least one processor, cause the apparatus at least: to listen and to receive a positioning measurement request from a location server at a first point of time; to determine whether a set of positioning metrics need to be measured, wherein the determining is based on an output from a machine learning classifier to which data relating to the measurements between two points of time is given as input; whether the output indicates a new measurement, to perform the measurement of positioning metrics from all transmission points; or if not, to determine which subset of transmission points needs to be measured and to perform the measurement of such subset of transmission points; and to report the measured positioning metrics to the location server.

According to a third aspect, there is provided a method comprising at least listening and receiving a positioning measurement request from a location server at a first point of time; determining whether a set of positioning metrics need to be measured, wherein the determining is based on an output from a machine learning classifier to which data relating to the measurements between two points of time is given as input; whether the output indicates a new measurement, performing the measurement of positioning metrics from all transmission points; or if not, determining which subset of transmission points needs to be measured and performing the measurement of such subset of transmission points; and reporting the measured positioning metrics to the location server.

According to a fourth aspect, there is provided a computer program product comprising computer program code configured to, when executed on at least one processor, cause an apparatus or a system to listen and to receive a positioning measurement request from a location server at a first point of time; to determine whether a set of positioning metrics need to be measured, wherein the determining is based on an output from a machine learning classifier to which data relating to the measurements between two points of time is given as input; whether the output indicates a new measurement, to perform the measurement of positioning metrics from all transmission points; or if not, to determine which subset of transmission points needs to be measured and to perform the measurement of such subset of transmission points; and to report the measured positioning metrics to the location server.

According to an embodiment, the apparatus further comprises means for measuring a set of positioning metrics as a response to another positioning measurement request from a location server at a second point of time, wherein the second point of time is earlier than the first point of time, and means for storing the set of positioning metrics with timestamps.

According to an embodiment, the apparatus further comprises means for associating the positioning metrics to a set of channel metrics extracted from a physical data channel.

According to an embodiment, the channel metrics comprises one or more of the following: channel frequency response; Signal-to-noise Ratio or Signal-to-Interference and Noise Ratio; Maximum Doppler shift; Channel Impulse Response; angle of arrival of one or more multipath components; maximum delay spread; received beam index.

According to an embodiment, determining which subset of transmission points needs to be measured is performed by determining whether the stored set of positioning metrics comprises measurement from transmission points of the positioning measurement request at the second point of time.

According to an embodiment, the input data for the machine learning classifier comprises set of channel metrics being computed between two time instances, wherein the set of channel metrics comprises one or more of the following: mean squared error between two consecutive channel frequency responses; signal-to-noise ratio difference; Doppler shift difference; delay and power drift of the strongest channel tap; current Signal-to-noise Ratio (SNR); number of available positioning metric measurements; angle of arrival of one or more multipath components; maximum delay spread; received beam index.

According to an embodiment, the computer program product is embodied on a non-transitory computer readable medium.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms carrying out an efficient positioning. While the following description focuses on 5G networks, the example embodiments as described further below should not unnecessarily be interpreted to be limited to said networks only, but they are applicable in any network supporting device and network efficient positioning.

Figure 1:
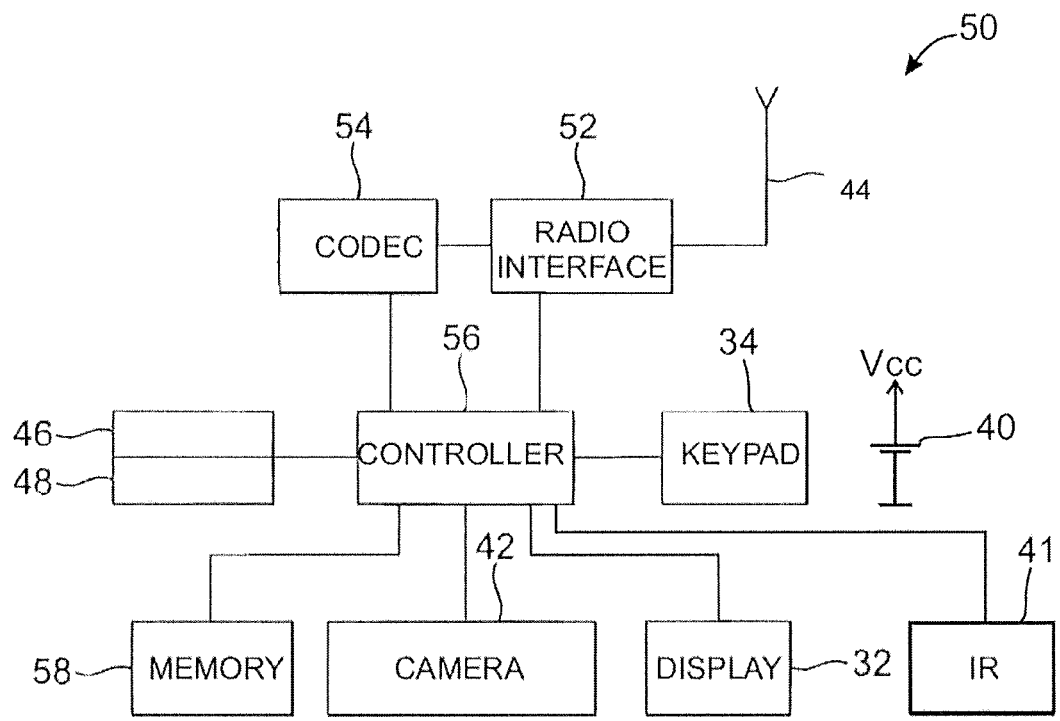
FIG. 1 shows a schematic block diagram of an apparatus for incorporating a dual-SIM/MUSIM arrangement according to the example embodiments.
Figure 2:
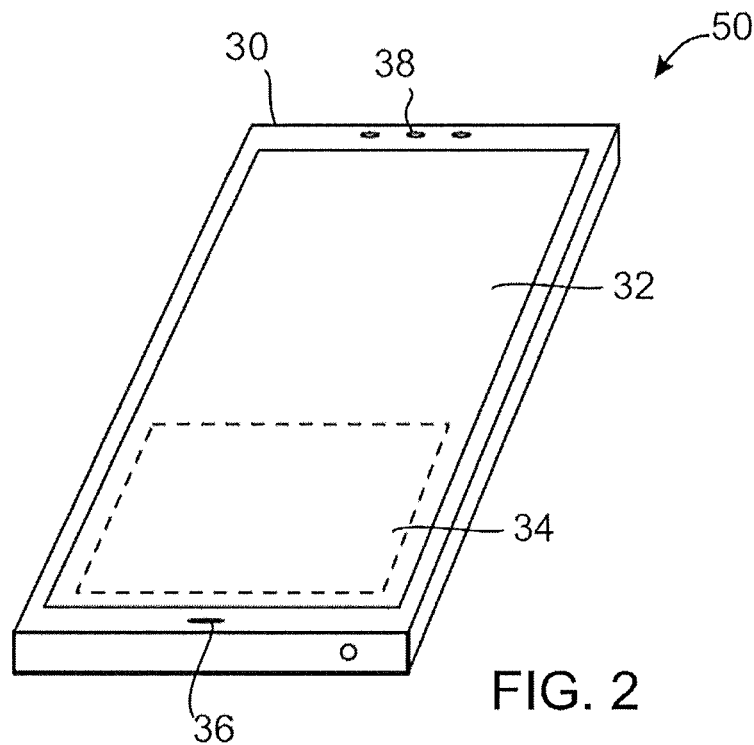
FIG. 2 shows schematically a layout of an apparatus according to an example embodiment.

In this regard, reference is first made to FIGS. 1 and 2, where FIG. 1 shows a schematic block diagram of an apparatus or electronic device 50 according to an example, which may incorporate the arrangement according to the example embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other example embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise input means 46 and output means 48 for receiving and transmitting data, respectively.

In the following, example embodiments representing various implementations, will be described using, as an example of an access architecture to which the example embodiments may be applied, a radio access architecture based on Long Term Evolution Advanced (LTE Advanced, LTE-A) or new radio (NR, 5G), without restricting the example embodiments to such an architecture, however. A person skilled in the art appreciates that the example embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
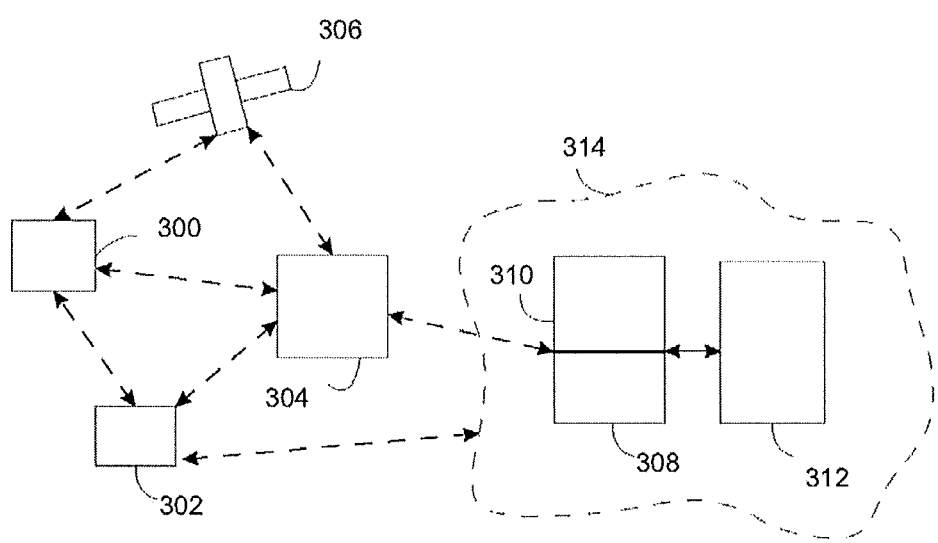
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system may comprise also other functions and structures than those shown in FIG. 3. The example embodiments are not, however, restricted to the system given as an example but a person skilled in the art may apply the solution to other communication systems provided with necessary properties.

FIG. 3 shows an example of a part of a radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device may refer to a portable computing device or non-portable computing device that includes wired or wireless communication devices operating with or without a subscriber identification module (SIM), including, but not limited to, the following types of devices: a mobile station (mobile phone), smartphone, personal digital assistant (PDA), handset, smart watch, vehicle, smart home appliance, device using a wireless modem (alarm or measurement device, etc.), laptop and/or touch screen computer, tablet, game console, notebook, personal computer, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some example embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The (e/g)NodeBs of FIG. 3 may provide any kind of these cells. A cellular radio system may be implemented as a multilayer network including several kinds of cells. In multilayer networks, one access node may provide one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. A network which is able to use "plug-and-play" (e/g)Node Bs, may include, in addition to Home (e/g)NodeBs (H(e/g) nodeBs), a home node B gateway, or HNB-GW (not shown in FIG. 3). A HNB Gateway (HNB-GW), which may be installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

For the 5G technology, one of the design goals has been improved location requirements. To meet the requirements of emerging applications such as intelligent transportation, augmented virtual reality, industrial automation, etc, three new service categories has been defined for 5G: enhanced mobile broadband (eMBB), massive machine-type communication (mMTC) and ultra-reliable low-latency communication (URLLC).

One of the categories introduced in 5G NR (Fifth Generation New Radio) networks is NR Positioning. The two latest versions of the 5G standard are 3GPP Release 16 and 17.

3GPP Release 16 introduced various location technologies to support regulatory and commercial use case. The horizontal positioning requirements for indoor scenarios and outdoor scenarios were specified.

3GPP Release 17 is targeted for a higher accuracy location requirements to meet performance targets having sub-meter level positioning accuracy <1 m for general commercial use cases, and <0.2 m position accuracy for IIoT (Industrial Internet of Things) use cases.

3GPP Release 17 discloses an objective, that to support high accuracy (horizontal and vertical), low latency, network efficiency (scalability, RS (Reference Signal) overhead, etc.), and device efficiency (power consumption, complexity, etc) requirements for commercial use cases (including general commercial use case and (I)IoT use cases, e.g. positioning techniques, DL/UL (UpLink/DownLink) positioning reference signals, signalling and procedures for improved accuracy, reduced latency, network efficiency and device efficiency should be identified and evaluated.

When receiving a request for a location service associated with a particular UE or when initiating a location service by itself, the 5G Core Access and Mobility Management Function (AMF) sends a location services request to a Location Management Function (LMF). LMF is a network entity, such as a location server, in 5G Core Network, and supports location determination for a UE. The serving gNB provides measurement information for a target UE and communicates the measurement information to the LMF. Thus, LMF may interact with the serving gNB in order to obtain position measurement for the UE including uplink measurements made by an ng-eNG and downlink measurements made by the UE. The LMF returns the result (i.e. a position estimate for the UE) of the location service back to the AMF, which forwards the result to an entity requesting the location.

Device efficient positioning may focus on idle/inactive mode positioning, where the UE (User Equipment) uses data efficient transmission techniques (such as early data and/or small data transmission) for reporting the measurement results to the network. There are also solutions, where a first UE can report its measurements to a second UE which estimates the location of the first UE. However, an improved solution for device efficient positioning that addresses to the requirements of 3GPP Release 17 is needed.

Thus the example embodiments are targeted to a method for device and network efficient positioning, targeting both the control of power consumption and that of the complexity and reporting of the positioning related measurements.

As discussed in the background portion of the present disclosure, in the positioning protocol according to the standard, a network entity, e.g. the location management function (LMF) requests the UE to report back timing and/or angular measurements for all detectable beams of all detectable transmit receive points (TRP). By default, the UE treats each positioning request identically, i.e. by listening for, and measuring beamed downlink positioning reference signals (PRS) during a certain time window.

The UE attempts to detect the PRS of the TRPs indicated by the network, and in case of success, to estimate the time and/or angle of arrival (TOA/AOA), or any other metric requested by the network, of the line of sight (LOS) for each beam of each detected PRS. One of the scenarios consists of a request from the network to measure N>24 TRPs, each with K>8 beams, yielding the heavy UE task of detecting and measuring N*K>192 signals per positioning request. The problem becomes exacerbated at higher carrier frequencies, as the number of beams per TRP K increases, leading to a large number of measured signals in the order of thousands. Thus, it is very impractical for the UE to repeat the measurements at each request, without a prior evaluation of whether the measurement is indeed needed.

For example, if the UE has either not moved, or has moved a negligible distance with regard to positioning accuracy requirement in between two consecutive positioning requests, whereupon the UE does not need to re-do all the measurements, and may decide which subset of those it makes sense to re-do, if at all. Thus, the problem the present example embodiments are targeted to, is how the UE minimizes the overhead associated with positioning measurement collection and reporting. Specifically, how the UE decides when to trigger a new positioning measurement, and how extensive the measurements need to be; how the UE reports most efficiently the results of its measurement.

The present example embodiments are targeted to a UE method for device and network efficient positioning, targeting both the control of power consumption and that of the complexity and reporting of the positioning related measurements.

The present example embodiments are proposing a solution by means of which the overhead of the positioning measurement operations may be minimized in the UE, and where machine learning is used for determining whether the UE needs to trigger new measurement collection.

The example embodiments provides signalling targeted at device and network efficient positioning. Specifically, the solution is about a UE-centric method through which the UE is capable of deciding when and how many of the DL PRS is to be re-measured and reported back to the network entity, for example a location server, such as LMF.

In the example embodiments, a set of channel metrics that have been extracted from the physical data channel (e.g. PDSCH, PDCCH) on the serving link are processed and applied to the machine learning classifier to identify whether UE channels towards several other neighbour cells have suffered drastic changes (for example due to the change of UE's location), which requires new positioning measurements.

In an example embodiment, a method performed at the UE may comprise the following:
a) receiving from a network entity, such as LMF, a DL positioning request at time t0. As a response to the positioning request, measuring positioning metrics PM (i.e. time/angular metrics) from a set of detected beams of all the detected TRP IDs, and reporting PM to the network entity;
b) storing the positioning metrics to a memory with timestamps, and associating them to a set of channel metrics extracted from a physical data channel (e.g. PDSCH), later referred to as PDSCH measurements. It is to be noticed, that the UE is configured to tag the non-detectable TRPs with the label N/A, and store them in associating with the detected TRPs. The PDSCH measurements are performed by extracting channel metrics, e.g. using PDSCH RS, which may consist of estimating one or more of the following:
  a. The channel frequency response CRF at t0, called CFR(t0);
  b. The SNR(t0) (Signal to Noise Ratio) or the SINR (Signal to Interference and Noise Ratio);
  c. Maximum Doppler shift fd(t0);
  d. CIR(t0) (Channel Impulse Response) where the strongest component is characterized by the delay tau(t0) and power P(t0).

Other examples of the suitable metrics comprise angle of arrival of one or more multipath components; maximum delay spread; received beam index, etc. It is also appreciated that any future metric being applicable as a channel metric can be used instead or in addition to the ones listed above.

The measured and determined metrics may be stored in a table being formed as follows:

| Timestamp | PM(TRPi, beam x) | ... | PM(TRPk, beam j) | PDSCH-meas |
|---|---|---|---|---|
| T0 | PM(TRPi, beam x, t0) | | N/A | CFR(t0), SNR(t0), fd(t0), tau(t0), P(t0) | c) receiving from the network entity, a subsequent DL positioning request at time t1. As a response to the subsequent positioning request, the UE is configured to decide whether new PMs need to be acquired. To facilitate the decision, the UE measures the channel metrics, i.e., PDSCH and determines the following RS measurements: CFR(t1), SNR(t1), fd(t1), tau(t1), P(t1).
d) computing a set of metrics, among which, but not limited to, several distances between the measured channel metrics, PDSCH RS, at the two time instances. The distances may comprise one or more of the following:
  a. The mean squared error (MSE) between the two consecutive CFRs;
  b. The SNR difference;
  c. The Doppler difference $|fd(t1)-fd(t0)|$
  d. The delay and power drift of the strongest channel tap, i.e.:
   $|tau(t1)-tau(t0)|$
   $|P(t1)-P(t0)|$.
  e. The current SNR(t1) to act as a trust metric of the current channel measurements, and in addition, the UE may compute:
  f. the number of available PM measurements at t0, i.e. Card[S, S={PM(TRPi, beam x), where PM(TRPi, beam x) !=N/A}], where the "=" designates "not equal". It is to be noticed that this metric indicates whether sufficient measurements were collected in the past to ensure an unambiguous location estimate.

Other examples of the suitable metrics comprise angle of arrival of one or more multipath components; maximum delay spread; received beam index, etc. It is also appreciated that any future metric being applicable as a channel metric can be used instead or in addition to the ones listed above.

These metrics are later referred to with "data a-f".
e) using the data a-f and potentially other sensor (e.g. gyroscope, proximity) measurements as input to a machine learning (ML) binary classifier which is configured to output:

1—indicating that a new measurement needs to be performed

0—indicating that the wireless propagation channel has not considerably changed around the UE, and the positioning measurements from the previous report at t0 may be reused.

f) If the classifier outputs 1, the UE performs a complete measurement again, and reports all the PM measurements to the network entity. In addition, the UE stores the PM measurements to a memory, for example in the table shown above. If the classifier outputs 0, UE checks entry t0 from the table, and determines how many of the newly requested TRP IDs (signaled by LMF at t1) was already measured at t0.

If the UE has measurements for all the TRPs (i.e., none of the TRP(t0) have been tagged as N/A), and all the newly requested TRP(t1) are in the list of TRP(t0), then the UE is configured to respond with SMI=0 (Short Message Identifier), signalling that the LMF may use the previously reported PM(t0) measurements, being stored at the LMF.

If the UE does not have PM measurements for a certain subset of TRPs, called subset_TRP, then the UE is configured to trigger positioning measurement only for such subset and to report back the subsequent reduced PM set, called subset_PM and an SMI=0, signalling that the LMF may use the previously reported PM(t0) measurement for the remaining TRPs.

Alternatively, the UE may measure the subset_PM, but report a full report composed of PM(t0) being determined from the table and subset_PM(t1). In this case, the signalling remains unchanged.

The example embodiments are discussed in more detailed manner with respect to an ML UE method, and associated signalling to enable device and network efficient positioning. The machine learning classifier may be a deep neural network (DNN), convolutional neural network (CNN) or a decision tree, or other mathematical model capable of intelligent decision making. The classifier may be trained using as cost function any of the available cost functions for classification such as binary cross-entropy exponential loss, etc.

First Example Embodiment

The first example embodiment is performed after the UE has accomplished steps of receiving a first positioning request at t0; measuring and reporting back the first positioning metrics (PM); and storing the first positioning metrics in a table. Tagging a PM of a (beam, TRP ID) pair with N/A means that the UE hasn't detect the corresponding signal, upon request from the LMF.

As soon as the next (i.e., subsequent, i.e., the second after the first) DL positioning request is received, the UE is configured to determine what is the most efficient way to collect and report relevant PM measurements. To do that, the UE evaluates if the environment around the UE has changed significantly since the last UE reporting. This change is closely linked to the change of the UE position, since the geometry of the UE-gNB pairs impacts the wireless propagation conditions. The UE performs this evaluation by extracting a set of relevant channel metrics from the RS of the PDSCH, denoted as PDSCH-meas being stored together with PM in the table.

Based on the PDSCH_meas, the UE is configured to compute the delta metrics, i.e., "data a-f".

The data a-f is used as input to a ML classifier, with or without other sensor measurements. The classifier outputs 1 if the positioning measurement needs to be redone, and 0 otherwise.

If the classifier outputs 1, the UE performs a complete measurement again, and reports all the PM measurements to the network entity. In addition, the UE stores the PM measurements to a memory, for example in the table shown above. If the classifier outputs 0, UE checks entry t0 from the table, and determines how many of the newly requested TRP IDs (signaled by LMF at t1) was already measured at t0, and performs the measurement and reporting accordingly.

Training of the ML Classifier

To train the ML classifier with data a-f, training data is to be generated and labelled with binary label:

1—conditions have changed, hence PM needs to be redone;

0—conditions similar to past channel.

The label generation is performed by using the output of a non-cellular, high accuracy positioning module, e.g. GNSS receiver due to its widespread availability in most handheld devices.

Specifically, the UE listens the wireless propagation channel at time instances t(i), i=[t0,t1], and measures and stores at least:

a) CFR[t(i)], SNR[t(i)], fd[t(i)], P[t(i)] for the channel to the serving gNB.

b) Non-cellular positioning estimate acquired from the satellite receiver output, i.e. posVec[t(i)], where the vector may be composed of 2 or 3 entries, to designate the 2D or 3D position of the UE in a selected coordinate system. For example, posVec=[x, y, z] designates the 3D position in the Cartesian coordinate system.

Figure 4:
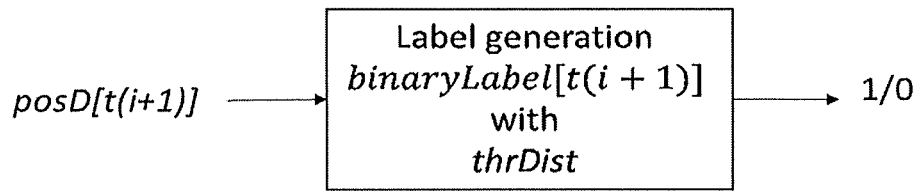
FIG. 4 shows an example of label generation.

For every pair of consecutive measurements of a), the UE is configured to compute the delta metrics, as show above and indicated with "data a-f". These will serve as input of the classifier. For every pair of consecutive measurements of b), the UE is configured to compute a distance metric, e.g. Euclidian, Manhattan, denoted as posD[t(i+1)]) =distance{posVec[t(i)], posVec[t(i+1)]}, where the "distance" is the Euclidean distance between the locations at time t(i), i.e. posVec[(t(i))], and time t(i+1), i.e. posVec[t(i+1)]. These are mapped to a label 1/0 by the function below (label generation is depicted in FIG. 4):

$$binary\,Label[t(i+1)] = \begin{cases} 1, & posD[t(i+1)] > thrDist \\ 0, & posD[t(i+1)] \leq thrDist \end{cases}$$

where thrDist is a non-negligible displacement, either chosen internally by the UE, or communicated by the LMF, according to the accuracy requirements of the application demanding location information. For example, thrDist=30 cm in line with Release 17 high accuracy requirements.

In many cases, thrDist is application dependent, therefore the UE may choose to train different ML instances, corresponding to e.g. either a high accuracy, high complexity (HA-HC) ML model for a low thrDist, i.e. thrDist1 (e.g. thrDist1 may be centimeters, for example 10 cm), or a low accuracy, low complexity (LA-LC) ML model for a high thrDist, i.e. thrDist2 (e.g. thrDist2 may be tens of centimeters or meters, for example 1 m), to be loaded and used on demand from the LMF.

Figure 5:
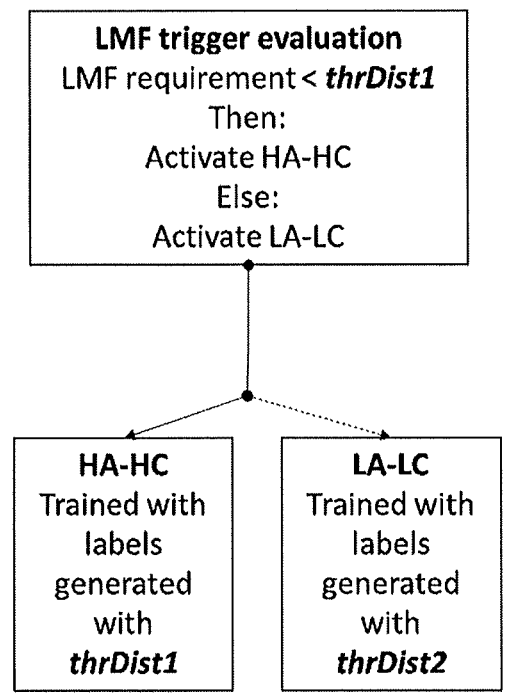
FIG. 5 shows an example of model loading for different accuracy requirements.

FIG. 5 illustrates an example, where the model loading is triggered by the network during the first positioning session. If the LMF accuracy requirement is below thrDist1, then HA-HC is activated, otherwise LA-LC. In HA-HC, the machine learning classifier is trained with labels generated with thrDist1. In LA-LC, the machine learning classifier is trained with labels generated with thrDist2.

Figure 6:
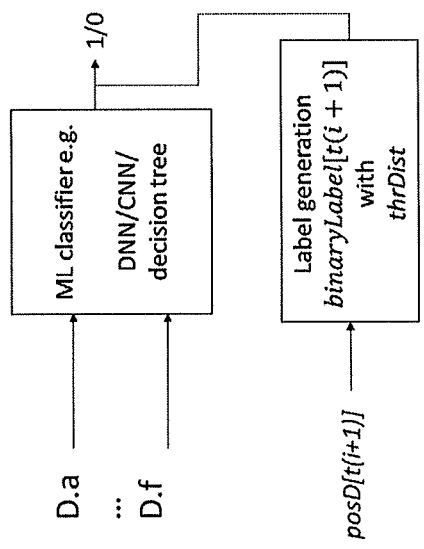
FIG. 6 shows an example of a machine learning (ML) classifier training.

Once the training data a-f has been labelled as described above, the classifier may be trained as depicted in FIG. 6.

Implementation

Figure 7:
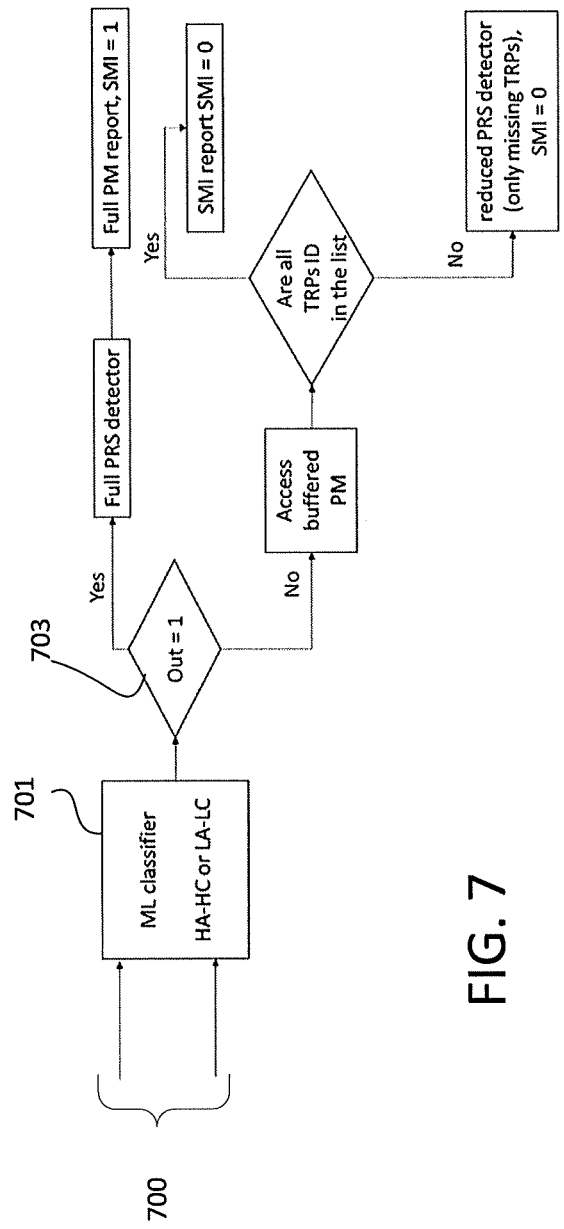
FIG. 7 shows an example of model loading and deployment.

Once the ML classifier model(s) has/have been trained, the UE may load one of the models 701 into a decision architecture as depicted in FIG. 7. Based on the input data 700, if the output 703 of the classifier 701 is 1, i.e. "Yes"-branch, then the UE measures all TRPs indicated in the LMF request, otherwise, i.e., "No"-branch, it may decide to measure only the missing subset (if not null).

Figure 8:
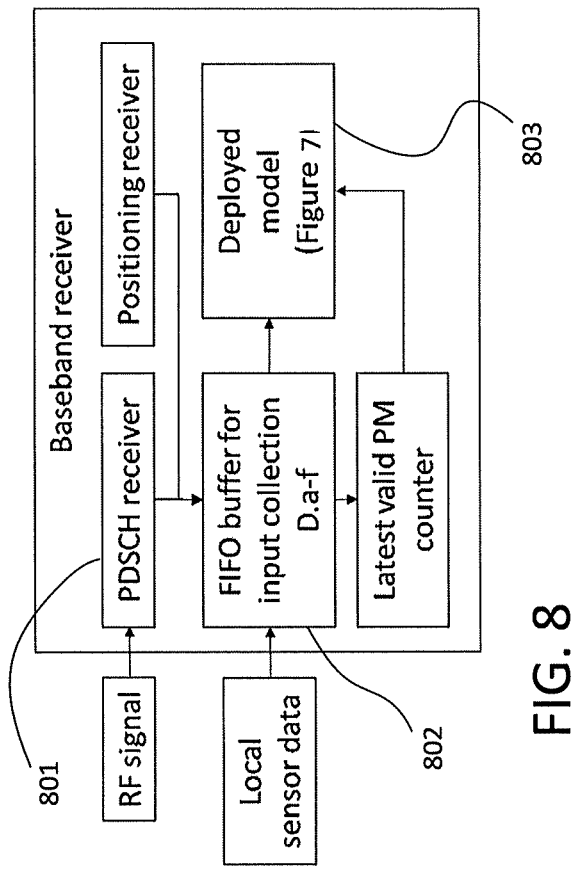
FIG. 8 shows an example of integration in the RX structure.

The blocks described in FIG. 7 may be integrated in the existing baseband architecture as shown in FIG. 8. Specifically, the channel metrics are collected from the output of the channel estimator of the PDSCH receiver 801, i.e. after OFDM demodulation, and stored into a FIFO (First-In-First-Out) buffer 802. The most recent entry is evaluated, and the number of valid measurements is counted and transferred to the ML model 803 as input as well.

Figure 9:
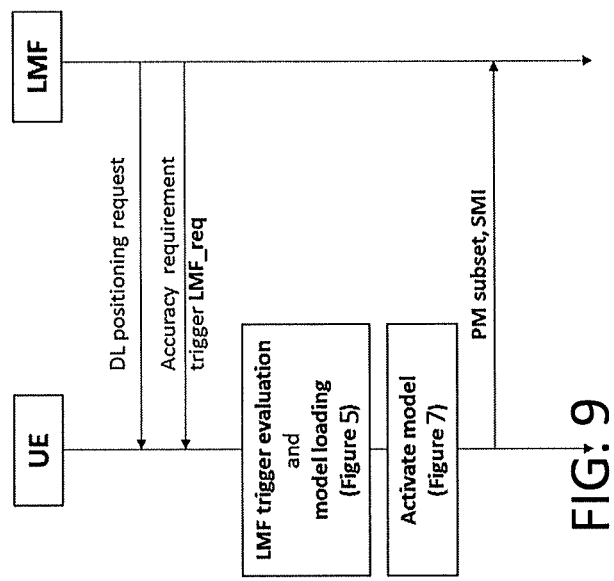
FIG. 9 shows an example of signalling flow according to a first embodiment.

The signalling flow supporting the method described above, i.e., that enables the UE decision and flexible PM reporting is depicted in FIG. 9, where the elements as presented by the current example embodiments are bold. The LMF makes a DL positioning request to UE, and indicates LMF_req, i.e. the accuracy requirement for thrDist. The UE performs LMF trigger evaluation and model loading as shown in FIG. 5. Then the UE activates either of the model HA-HC or LA-LC as shown in FIG. 7, and measures all or a missing subset TRP, depending on the output of the classifier. The UE transmits the positioning metric (PM) and the short message indication (SMI) to the LMF.

Second Example Embodiment

In another example embodiment, the UE may store the raw PDSCH samples, i.e. signal samples before OFDM demodulation and use them to train the ML classifier.

Figure 10:
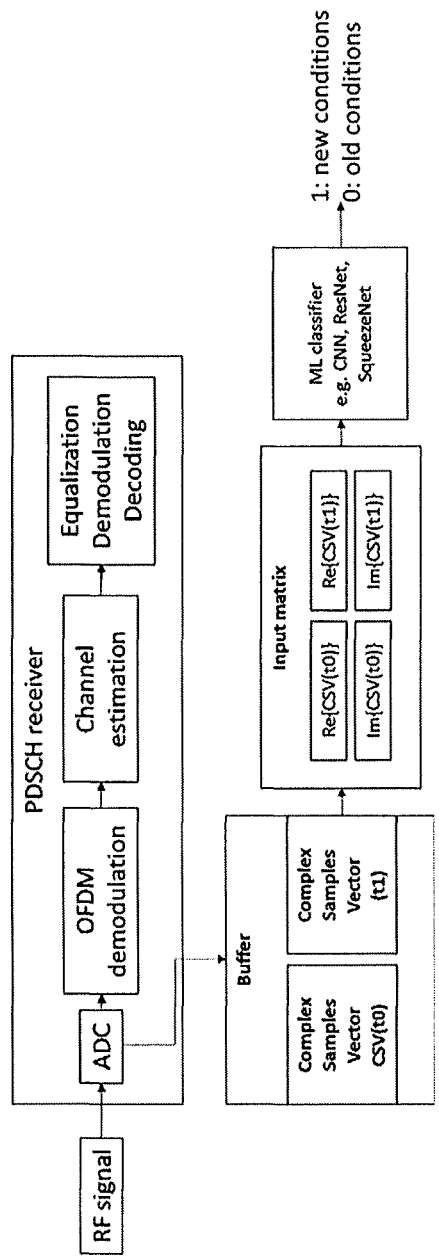
FIG. 10 shows an example of a second embodiment.

This embodiment has advantages, even though these samples need to be stored in a much larger buffer. This is because the samples contain implicit information about the channel response and noise levels, and they are not biased by the potential artifacts introduced by the additional processing of the PDSCH receiver. The ML classifier will operate on a matrix input, collecting signal samples from all antennas, at two consecutive PDSCH instances, i.e. t0 and t1. The input may be organized as by stacking the complex samples as shown in FIG. 10, where the real and imaginary parts of the samples are isolated and stacked together by e.g. concatenating row-wise in an input matrix. The label generation for the training phase stays the same as in the first embodiment, and so does the integration with the rest of the receiver's blocks. The module may be trained similarly e.g. the label generation may remain unchanged, and a similar cost function may be used, e.g. binary cross-entropy. Organizing the input in a 2D matrix enables the classifier to take advantage of the temporal dependencies between the samples, and segments the matrix into smaller portions where common features may be extracted from, similarly to processing a picture in image recognition applications.

In the previous description, efficient positioning has been discussed. The various embodiments may provide advantages. For example, the example embodiments provides device efficient positioning due to reducing computational complexity and hence reduced device consumption. In addition, the example embodiments provide network efficient positioning due to reducing reporting overhead.

Figure 11:
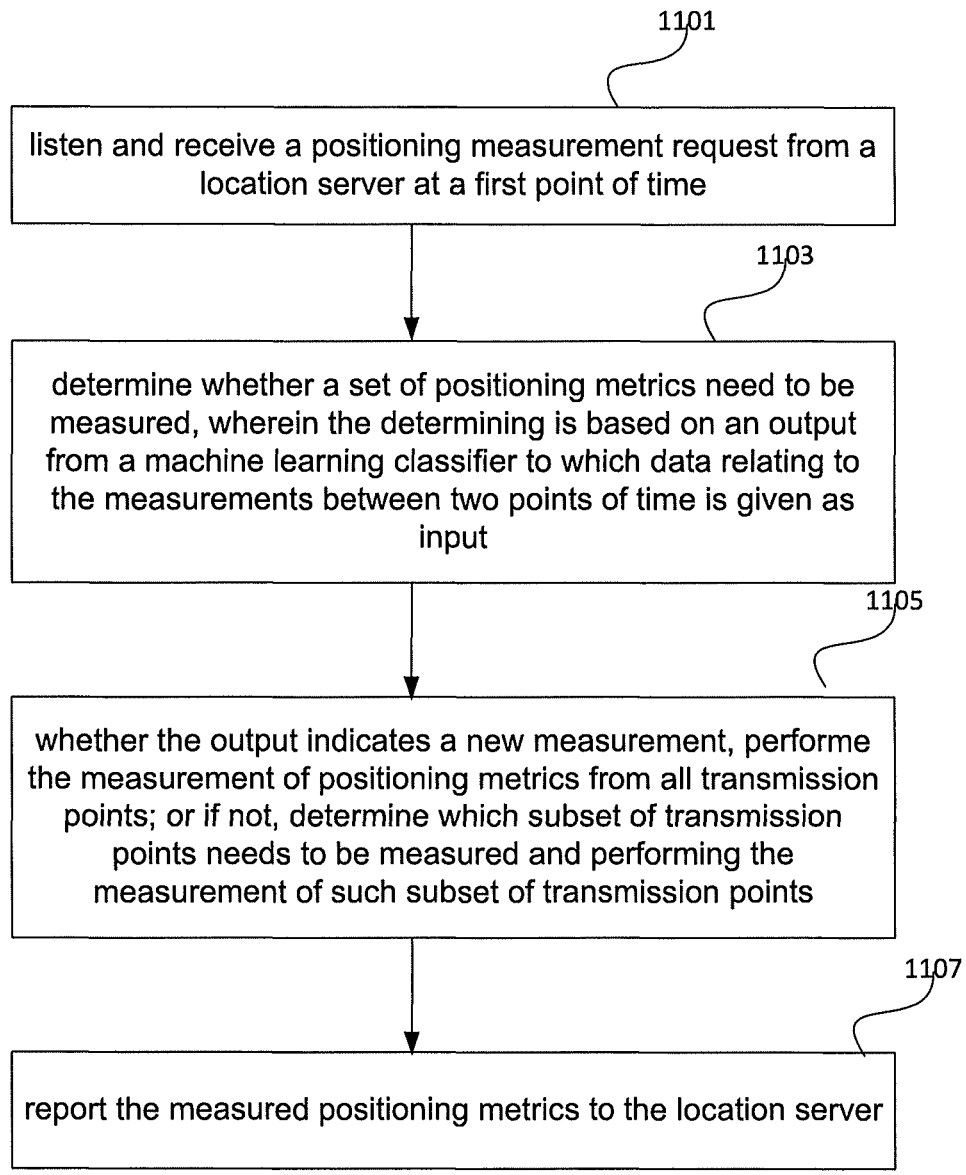
FIG. 11 is a flowchart illustrating a method according to an embodiment.

The method according to an embodiment is shown in FIG. 11. The method generally listening and receiving 1101 a positioning measurement request from a location server at a first point of time; determining 1103 whether a set of positioning metrics need to be measured, wherein the determining is based on an output from a machine learning classifier to which data relating to the measurements between two points of time is given as input; whether the output indicates a new measurement, performing 1105 the measurement of positioning metrics from all transmission points; or if not, determining which subset of transmission points needs to be measured and performing the measurement of such subset of transmission points; and reporting 1107 the measured positioning metrics to the location server. Each of the steps can be implemented by a respective module of a computer system.

An apparatus according to an embodiment comprises means for listening and receiving a positioning measurement request from a location server at a first point of time; means for determining whether a set of positioning metrics need to be measured, wherein the determining is based on an output from a machine learning classifier to which data relating to the measurements between two points of time is given as input; whether the output indicates a new measurement, means for performing the measurement of positioning metrics from all transmission points; or if not, means for determining which subset of transmission points needs to be measured and means for performing the measurement of such subset of transmission points; and means for reporting the measured positioning metrics to the location server. The means comprises at least one processor, and a memory including a computer program code, wherein the processor may further comprise processor circuitry. The memory and the computer program code are configured to, with the at least one processor, cause the apparatus to perform the method of FIG. 11 according to various embodiments.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus comprising:
    at least one processor; and
    at least one memory storing instructions that, when executed with the at least one processor, cause the apparatus at least to:
        listen for and receive a positioning measurement request from a location server at a first point of time;
        determine whether a set of positioning metrics need to be measured, wherein the determining is based on comparing data relating to measurements between two points of time;
        in response to a determination that the set of in positioning metrics need to be measured, perform measurement of the set of positioning metrics from a plurality of transmission points;
        in response to a determination that the set of positioning metrics do not need to be measured, determine a subset of the plurality of transmission points that need to be measured and perform measurement of the set of positioning metrics from the determined subset of transmission points; and
        report, to the location server, the at least one of:
            the measurements of the set of positioning metrics from the plurality of transmission points, or
            the measurements of the set of positioning metrics from the determined subset of transmission points.

2. The apparatus according to claim 1, wherein the instructions, when executed with the at least one processor, cause the apparatus to:
    measure the set of positioning metrics as a response to a second positioning measurement request from the location server at a second point of time, wherein the second point of time is earlier than the first point of time; and
    store the set of positioning metrics with timestamps.

3. The apparatus according to claim 2, wherein the instructions, when executed with the at least one processor, cause the apparatus to:
    associate the set of positioning metrics to a set of channel metrics extracted from a physical data channel.

4. The apparatus according to claim 3, wherein the set of channel metrics comprises one or more of the following:
    channel frequency response;
    signal-to-noise ratio or signal-to-interference and noise ratio;
    maximum Doppler shift;
    channel impulse response;
    angle of arrival of one or more multipath components;
    maximum delay spread; or
    received beam index.

5. The apparatus according to claim 2, wherein determining whether the set of positioning metrics needs to be measured comprises the instructions, when executed with the at least one processor, cause the apparatus to:
    determine whether the stored set of positioning metrics comprises measurements from the plurality of transmission points at the second point of time.

6. The apparatus according to claim 1, wherein the determining whether the set of positioning metrics need to be measured is based on an output from a machine learning classifier to which the data relating to the measurements between the two points of time is given as input.

7. The apparatus according to claim 6, wherein the input data for the machine learning classifier comprises a set of channel metrics computed between the two points of time, wherein the set of channel metrics comprises one or more of the following:
    mean squared error between two consecutive channel frequency responses;
    signal-to-noise ratio difference;
    Doppler shift difference;
    delay and power drift of the strongest channel tap;
    current Signal-to-noise Ratio;
    number of available positioning metric measurements;
    angle of arrival of one or more multipath components;
    maximum delay spread; or
    received beam index.

8. A method comprising at least:
    listening for and receiving a positioning measurement request from a location server at a first point of time;
    determining whether a set of positioning metrics need to be measured, wherein the determining is based on comparing data relating to measurements between two points of time;
    in response to a determination that the set of positioning metrics need to be measured, performing measurement of the set of positioning metrics from a plurality of transmission points;
    in response to a determination that the set of positioning metrics do not need to be measured, determining a subset of the plurality of transmission points that need to be measured and performing measurement of the set of positioning metrics from the determined subset of transmission points; and
    reporting, to the location server, the at least one of:
        the measurements of the set of positioning metrics from the plurality of transmission points, or
        the measurements of the set of positioning metrics from the determined subset of transmission points.

9. The method according to claim 8, further comprising:
    measuring the set of positioning metrics as a response to a second positioning measurement request from the location server at a second point of time, wherein the second point of time is earlier than the first point of time; and
    storing the set of positioning metrics with timestamps.

10. The method according to claim 9, further comprising:
    associating the set of positioning metrics to a set of channel metrics extracted from a physical data channel.

11. The method according to claim 10, wherein the set of channel metrics comprises one or more of the following:
    channel frequency response;
    signal-to-noise ratio or signal-to-interference and noise ratio;
    maximum Doppler shift;
    channel impulse response;
    angle of arrival of one or more multipath components;
    maximum delay spread; or
    received beam index.

12. The method according to claim 9, wherein determining which whether the set of positioning metrics needs to be measured comprises:
   determining whether the stored set of positioning metrics comprises measurements from the plurality of transmission points at the second point of time.

13. The method according to claim 8, wherein the determining whether the set of positioning metrics need to be measured is based on an output from a machine learning classifier to which the data relating to the measurements between the two points of time is given as input.

14. The method according to claim 13, wherein the input data for the machine learning classifier comprises a set of channel metrics computed between the two points of time, wherein the set of channel metrics comprises one or more of the following:
   mean squared error between two consecutive channel frequency responses;
   signal-to-noise ratio difference;
   Doppler shift difference;
   delay and power drift of the strongest channel tap;
   current Signal-to-noise Ratio;
   number of available positioning metric measurements;
   angle of arrival of one or more multipath components;
   maximum delay spread; or
   received beam index.

15. A non-transitory computer readable medium comprising program instructions stored thereon for performing at least the following:
   listening for and causing receiving of a positioning measurement request from a location server at a first point of time;
   determining whether a set of positioning metrics need to be measured, wherein the determining is based on comparing data relating to measurements between two points of time;
   in response to a determination that the set of positioning metrics need to be measured, performing measurement of the set of positioning metrics from a plurality of transmission points;
   in response to a determination that the set of positioning metrics do not need to be measured, determining a subset of the plurality of transmission points that need to be measured and performing measurement of the set of positioning metrics from the determined subset of transmission points; and
   causing reporting, to the location server, of the at least one of:
      the measurements of the set of positioning metrics from the plurality of transmission points, or
      the measurements of the set of positioning metrics from the determined subset of transmission points.

16. The non-transitory computer readable medium according to claim 15, wherein the program instructions stored thereon are further for performing:
   measuring the set of positioning metrics as a response to a second positioning measurement request from the location server at a second point of time, wherein the second point of time is earlier than the first point of time; and
   storing the set of positioning metrics with timestamps.

17. The non-transitory computer readable medium according to claim 16, wherein the program instructions stored thereon are further for performing:
   associating the set of positioning metrics to a set of channel metrics extracted from a physical data channel.

18. The non-transitory computer readable medium according to claim 17, wherein the set of channel metrics comprises one or more of the following:
   channel frequency response;
   signal-to-noise ratio or signal-to-interference and noise ratio;
   maximum Doppler shift;
   channel impulse response;
   angle of arrival of one or more multipath components;
   maximum delay spread; or
   received beam index.

19. The non-transitory computer readable medium according to claim 16, wherein determining whether the set of positioning metrics needs to be measured comprises the program instructions stored thereon are further for performing:
   determining whether the stored set of positioning metrics comprises measurements from the plurality of transmission points at the second point of time.

20. The non-transitory computer readable medium according to claim 15, wherein the determining whether the set of positioning metrics need to be measured is based on an output from a machine learning classifier to which the data relating to the measurements between the two points of time is given as input, wherein the input data for the machine learning classifier comprises a set of channel metrics computed between the two points of time, wherein the set of channel metrics comprises one or more of the following:
   mean squared error between two consecutive channel frequency responses;
   signal-to-noise ratio difference;
   Doppler shift difference;
   delay and power drift of the strongest channel tap;
   current Signal-to-noise Ratio;
   number of available positioning metric measurements;
   angle of arrival of one or more multipath components;
   maximum delay spread; or
   received beam index.

* * * * *